United States Patent
Zhang et al.

(10) Patent No.: US 9,341,252 B2
(45) Date of Patent: May 17, 2016

(54) WAVE GENERATOR AND STRAIN WAVE GEARING

(71) Applicant: HARMONIC DRIVE SYSTEMS INC., Tokyo (JP)

(72) Inventors: Xin Yue Zhang, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/425,679

(22) PCT Filed: Jul. 10, 2013

(86) PCT No.: PCT/JP2013/004272
§ 371 (c)(1),
(2) Date: Mar. 4, 2015

(87) PCT Pub. No.: WO2015/004693
PCT Pub. Date: Jan. 15, 2015

(65) Prior Publication Data
US 2015/0219200 A1   Aug. 6, 2015

(51) Int. Cl.
*F16H 1/32*  (2006.01)
*F16H 49/00* (2006.01)
*F16H 55/08* (2006.01)

(52) U.S. Cl.
CPC ............ *F16H 49/001* (2013.01); *F16H 55/084* (2013.01); *F16H 1/32* (2013.01); *Y10T 74/19642* (2015.01)

(58) Field of Classification Search
CPC . F16H 49/001; F16H 49/003; F16H 55/0833; F16H 55/084; F16H 1/32
USPC ............................................ 74/438, 461, 640
See application file for complete search history.

(56) References Cited

U.S. PATENT DOCUMENTS 3,667,320 A    6/1972  Robinson
8,555,505 B2 * 10/2013  Ishikawa ............. F16H 55/0833
                                                    29/893

FOREIGN PATENT DOCUMENTS

JP    1-122543 U    8/1989
JP    5-132292 A    5/1993
(Continued)

OTHER PUBLICATIONS

International Search Report (PCT/ISA/210) mailed on Oct. 8, 2013, by the Japanese Patent Office as the International Searching Authority for International Application No. PCT/JP2013/004272.

*Primary Examiner* — William Kelleher
*Assistant Examiner* — Bobby Rushing, Jr.
(74) *Attorney, Agent, or Firm* — Buchanan Ingersoll & Rooney PC

(57) ABSTRACT

A wave generator (5) for a flat-type strain wave gearing (1) has a first elliptical outer circumferential surface (6S) of a first wave generator portion (5S) defined by a first elliptical curve (C1), and a second elliptical outer circumferential surface (6D) of a second wave generator section (5D) defined by a second elliptical curve (C2). Compared to using a wave generator for which the contour is defined by a single elliptical curve, differences between the ball load distribution of the first wave generator portion (5S) and the ball load distribution of the second wave generator portion (5D) can be suppressed, both ball load distributions can be equalized, and the equivalent ball load can be reduced; therefore, an increase in the lifespan of the wave generator bearing can be achieved.

5 Claims, 3 Drawing Sheets

(56) References Cited

FOREIGN PATENT DOCUMENTS

| JP | 11-351341 | A | 12/1999 |
| JP | 2009-299765 | A | 12/2009 |
| JP | 2013-015191 | A | 1/2013 |
| JP | WO 2015075781 A1 * | 5/2015 | ............ F16H 49/001 |

* cited by examiner

WAVE GENERATOR AND STRAIN WAVE GEARING

TECHNICAL FIELD

The present invention relates to a strain wave gearing in which a cylindrical externally toothed gear is ellipsoidally flexed by a wave generator of ellipsoidal contour to partially mesh with first and second internally toothed gears. Specifically, the present invention relates to an improvement in the ellipsoidal contour of a wave generator.

BACKGROUND ART

A flat-type strain wave gearing typically comprises a stationary-side internally toothed gear secured so as to not rotate, a driving-side rotatably drivable internally toothed gear, a cylindrical externally toothed gear capable of flexing in the radial direction, and a wave generator for causing the externally toothed gear to flex ellipsoidally. At the two major-axis-direction end parts of the ellipsoidal shape of the externally toothed gear ellipsoidally flexed by the wave generator, the external tooth portions on one side in the tooth trace direction mesh with the stationary-side internally toothed gear and the external tooth portions on the other side in the tooth trace direction mesh with the driving-side internally toothed gear. The number of teeth on the externally toothed gear is the same as the number of teeth on the driving-side internally toothed gear, but is two less than the number of teeth on the stationary-side internally toothed gear.

When the wave generator, which is a rotation-inputting component, rotates, the position at which the stationary-side internally toothed gear meshes with the externally toothed gear and the position at which the driving-side internally toothed gear meshes with the externally toothed gear move in a circumferential direction. In a single, full rotation made by the wave generator, the externally toothed gear rotates by an amount corresponding to the difference in the number of teeth with respect to the stationary-side internally toothed gear. Because the driving-side internally toothed gear has the same number of teeth as the externally toothed gear, the driving-side internally toothed gear rotates integrally with the externally toothed gear. The rotation of the wave generator is reduced in accordance with the difference in the number of teeth, and the reduced rotation is outputted from the driving-side internally toothed gear, which is a reduced-rotation-outputting component.

The wave generator of a flat-type strain wave gearing comprises a wave generator plug having a rigid body of ellipsoidal contour. A wave generator bearing comprising flexible inner/outer races is mounted to the outer peripheral surface of the wave generator plug. Patent Document 1 discloses a wave generator bearing comprising two rows of balls supporting portions of an externally toothed gear that correspond to a stationary-side internally toothed gear and a driving-side internally toothed gear, respectively.

Patent Document 2 discloses a wave generator formed from a pair of ellipsoidal bodies obtained by dividing a wave generator plug in an axial direction, each of the ellipsoidal bodies causing an externally toothed gear to flex ellipsoidally, a wave generator bearing being interposed therebetween. The two ellipsoidal bodies are identically formed, and are set to rotate reciprocally by a prescribed angle.

Patent Document 3 discloses a wave generator in which a wave generator plug is configured from identically formed first and second cams, the wave generator being assembled in a state in which the first and second cams are rotated reciprocally by 90°.

In Patent Document 4, the inventors proposed a plug-shaped curve for defining the ellipsoidal contour of a wave generator plug.

PRIOR ART DOCUMENTS

Patent Documents

[Patent Document 1] JP H05-132292A
[Patent Document 2] JU H01-122543A
[Patent Document 3] JP 2013-15191A
[Patent Document 4] JP H11-351341A

SUMMARY OF THE INVENTION

Problems to be Solved by the Invention

In conventional flat-type strain wave gearings, a single curve is used as a shaping curve for defining the ellipsoidal contour shape of a wave generator. Specifically, each portion of the externally toothed gear in the tooth trace direction is flexed into an identical ellipsoidal shape, and the externally toothed gear meshes with both the stationary-side internally toothed gear and the driving-side internally toothed gear. Alternatively, as disclosed in Patent Documents 2 and 3, the externally toothed gear may be made to mesh with the stationary-side and driving-side internally toothed gears with the phase of the identical ellipsoidal shape having been changed.

The relatively rotating stationary-side internally toothed gear and externally toothed gear differ from the integrally rotating driving-side internally toothed gear and externally toothed gear in terms of the state of meshing between the gears, the state of stress generation, and other mechanical or dynamic characteristics. When the externally toothed gear is flexed so as to have identical ellipsoidal curves in the tooth trace direction irrespective of these differences, the portion of the externally toothed gear meshing with the stationary-side internally toothed gear differs greatly from the portion of the externally toothed gear meshing with the driving-side internally toothed gear in terms of the distribution of stress generated therein, the amount of stress generated, and the shape of the portion.

Therefore, in the wave generator, the wave generator bearing that supports the portion of the externally toothed gear meshing with the stationary-side internally toothed gear and the wave generator bearing that supports the portion of the externally toothed gear meshing with the driving-side internally toothed gear differ greatly in terms of ball load distribution, and the maximum ball load is increased. As a result, the service life of the wave generator bearings may be reduced.

Conventionally, such points are not taken into consideration. No attention has been directed at using a wave generator comprising, as a shaping curve for defining the contour shape of the wave generator, a shaping curve suitable for causing an externally toothed gear to flex and mesh with a stationary-side internally toothed gear and a shaping curve suitable for causing the externally toothed gear to flex and mesh with a driving-side internally toothed gear, nor has such a wave generator been proposed.

It is an object of the present invention to provide a wave generator for a strain wave gearing, the wave generator comprising a contour shape capable of causing an externally toothed gear to flex into a shape suitable for meshing with a stationary-side internally toothed gear and of causing the externally toothed gear to flex into a shape suitable for meshing with a driving-side internally toothed gear.

It is another object of the present invention to provide a strain wave gearing comprising this navel wave generator.

Means to Solve the Problems

In order to address the aforementioned problem, the present invention is a wave generator for a strain wave gearing in which a cylindrical externally toothed gear capable of flexing in the radial direction is caused to flex ellipsoidally and partially mesh with both a rigid first internally toothed gear and a rigid second internally toothed gear coaxially arranged adjacent to the first internally toothed gear, the wave generator being characterized in comprising:

a first wave generator portion for causing a first externally toothed gear portion on one side of the externally toothed gear in the tooth trace direction to flex ellipsoidally and partially mesh with the first internally toothed gear, and a second wave generator portion for causing a second externally toothed gear portion on the other side of the externally toothed gear in the tooth trace direction to flex ellipsoidally and mesh with the second internally toothed gear;

when the number of teeth on the first internally toothed gear is 2n more than the number of teeth on the externally toothed gear, assuming n to be a positive integer, and the number of teeth on the second internally toothed gear is equal to the number of teeth on the externally toothed gear, the first wave generator portion having an ellipsoidal contour defined by a first ellipsoidal curve, and the second wave generator portion having an ellipsoidal contour defined by a second ellipsoidal curve;

the circumference of the first ellipsoidal curve being equal to the circumference of the second ellipsoidal curve;

the major axis of the first ellipsoidal curve being identical to the major axis of the second ellipsoidal curve; and the minor axis of the first ellipsoidal curve being shorter than the minor axis of the second ellipsoidal curve.

Typically, the first wave generator portion comprises a first wave generator plug having a first ellipsoidal outer-peripheral surface, and an ellipsoidally flexed first wave generator bearing mounted to the first ellipsoidal outer-peripheral surface of the first wave generator plug. Similarly, the second wave generator portion comprises a second wave generator plug having a second ellipsoidal outer-peripheral surface, and an ellipsoidally flexed second wave generator bearing mounted to the second ellipsoidal outer-peripheral surface of the second wave generator plug. In this case, the first ellipsoidal outer-peripheral surface of the first wave generator portion is defined by the first ellipsoidal curve, and the second ellipsoidal outer-peripheral surface of the second wave generator portion is defined by the second ellipsoidal curve.

Next, the strain wave gearing of the present invention is characterized in comprising:

a rigid internally toothed gear; an externally toothed gear capable of flexing in the radial direction, the externally toothed gear being arranged inside the internally toothed gear; and a wave generator for causing the externally toothed gear to flex ellipsoidally and partially mesh with the internally toothed gear;

the internally toothed gear comprising a first internally toothed gear and a second internally toothed gear coaxially arranged adjacent to the first internally toothed gear;

the externally toothed gear comprising, on one side thereof in the tooth trace direction, a first externally toothed gear portion capable of meshing with the first internally toothed gear, and, on the other side thereof in the tooth trace direction, a second externally toothed gear portion, the second externally toothed gear portion being capable of meshing with the second internally toothed gear;

the number of teeth on the first internally toothed gear being 2n more than the number of teeth on the externally toothed gear, assuming n to be a positive integer, and the number of teeth on the second internally toothed gear being equal to the number of teeth on the externally toothed gear;

the wave generator comprising a first wave generator portion for causing the first externally toothed gear portion to flex ellipsoidally on one side in the axial direction and partially mesh with the first internally toothed gear, and a second wave generator portion for causing the second externally toothed gear portion to flex ellipsoidally on the other side in the axial direction and partially mesh with the second internally toothed gear;

the first wave generator portion comprising an ellipsoidal contour defined by a first ellipsoidal curve, and the second wave generator portion comprising an ellipsoidal contour defined by a second ellipsoidal curve;

the circumference of the first ellipsoidal curve being equal to the circumference of the second ellipsoidal curve;

the major axis of the first ellipsoidal curve being identical to the major axis of the second ellipsoidal curve; and the minor axis of the first ellipsoidal curve being shorter than the minor axis of the second ellipsoidal curve.

When the strain wave gearing is used as reducer, typically, the wave generator is a rotation-inputting component, the first internally toothed gear is a stationary-side internally toothed gear secured so as to not rotate, and the second internally toothed gear is a reduced-rotation-outputting component which is a driving-side internally toothed gear capable of rotating.

Effect of the Invention

The wave generator of the present invention is designed so that the first externally toothed gear portion flexes so as to follow the first ellipsoidal curve and the second externally toothed gear portion flexes so as to follow the second ellipsoidal curve. This allows the meshing position between the second internally toothed gear and the second externally toothed gear portion to move, relative to the meshing position between the first internally toothed gear and the second externally toothed gear portion, toward the major-axis position side of the ellipsoidal curve.

When the first and second externally toothed gear portions flex so as to follow identical ellipsoidal curves, tooth tip interference or other adverse events may occur in the meshing between the second internally toothed gear and the second externally toothed gear portion, even when the meshing state between the first internally toothed gear and the first externally toothed gear portion is excellent. According to the present invention, such drawbacks can be prevented or suppressed; therefore, it is possible to maintain excellent meshing between the first internally toothed gear and the first externally toothed gear portion and excellent meshing between the second internally toothed gear and the second externally toothed gear portion.

According to the present invention, differences between the load distribution of the first wave generator bearing supporting the first externally toothed gear portion which meshes with the first internally toothed gear and the load distribution of the second wave generator bearing supporting the second externally toothed gear portion which meshes with the second internally toothed gear can be suppressed to a greater extent than when a wave generator is used in which the contour shape is defined by a single ellipsoidal curve. Additionally, both load distributions can be made uniform, and the maximum generated stress can be reduced. This makes it possible to improve the service life of the wave generator bearings.

2(b) is an exploded perspective view of the same; and

Figure 1:
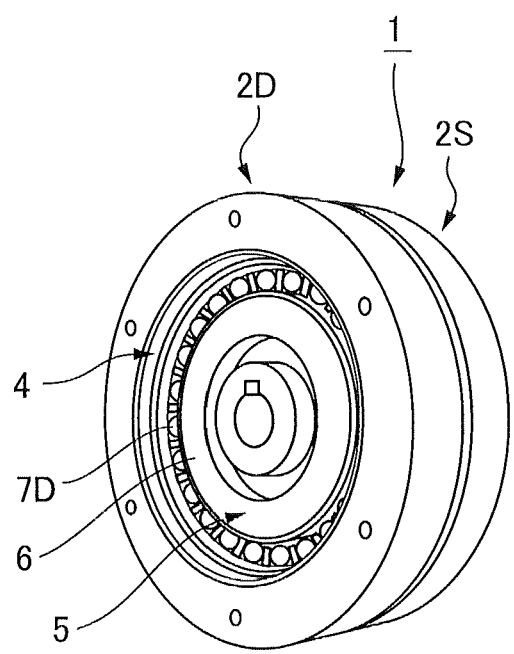
FIG. 1 is a perspective view showing a flat-type strain wave gearing to which the present invention is applied.

FIG. 3(a) is a graph showing examples of the first and second ellipsoidal curves defining the ellipsoidal outer-peripheral surfaces of the wave generator plugs in the strain wave gearing of FIG. 1, and FIG. 3(b) is a diagram schematically showing the shapes of the ellipsoidal outer-peripheral surfaces of the wave generator plugs.

MODE FOR CARRYING OUT THE INVENTION

Figure 2:
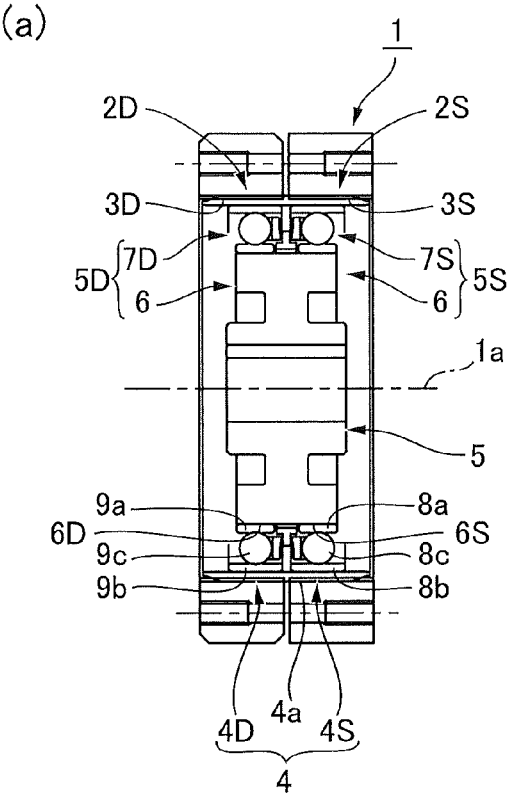
FIG. 2(a) is a vertical cross-sectional view of the strain wave gearing of FIG. 1, and FIG.
Figure 2:
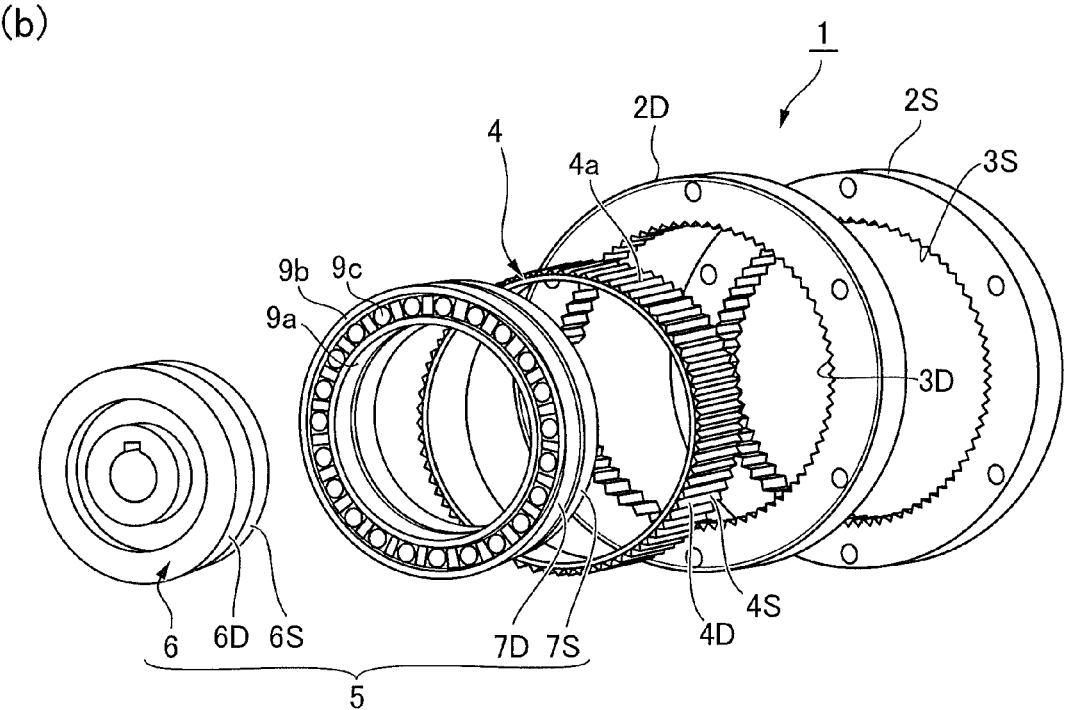

An embodiment of a flat-type strain wave gearing to which the present invention is applied is described below with reference to the annexed drawings. FIG. 1 is a perspective view showing a flat-type strain wave gearing pertaining to the present embodiment. FIG. 2(a) is a vertical cross-sectional view of the same, and FIG. 2(b) is an exploded perspective view of the same. The overall configuration of the flat-type strain wave gearing will be described with reference to these drawings.

A strain wave gearing 1 comprises a rigid first internally toothed gear 2S of annular shape and a rigid second internally toothed gear 2D of annular shape. The first and second internally toothed gears 2S, 2D are arranged in parallel in a coaxial state, there being a slight gap in the direction of the central axis 1a. The first internally toothed gear 2S is a stationary-side internally toothed gear secured to a securing-side member (not shown) so as not to rotate. The second internally toothed gear is a rotatable driving-side internally toothed gear.

A cylindrical externally toothed gear 4 capable of flexing in the radial direction is arranged in a coaxial state inside the stationary-side first internally toothed gear 2S and the driving-side second internally toothed gear 2D. When the externally toothed gear 4 is caused to flex ellipsoidally, the two end portions on the major-axis positions of the ellipsoidal shape of the externally toothed gear 4 are capable of meshing with the first internally toothed gear 2S and the second internally toothed gear 2D. The number of teeth on the first internally toothed gear 2S is 2n more than the number of teeth on the externally toothed gear 4, assuming n to be a positive integer, and the number of teeth on the second internally toothed gear 2D is equal to the number of teeth on the externally toothed gear 4. Typically, the number of teeth on the first internally toothed gear 2S is 2 more than the number of teeth on the externally toothed gear 4 (n=1).

The portion of the externally toothed gear 4 that faces the internal teeth 3S of the first internally toothed gear 2S is a first externally toothed gear portion 4S, and the portion of the externally toothed gear 4 that faces the internal teeth 3D of the second internally toothed gear 2D is a second externally toothed gear portion 4D, a central position in the tooth trace direction (direction of the central axis 1a) of the externally toothed gear 4 being taken as a boundary. That is to say, each of the external teeth 4a of the externally toothed gear 4 comprises an external tooth portion facing the internal teeth 3S of the first internally toothed gear 2S and an external tooth portion facing the internal teeth 3D of the second internally toothed gear 2D, a central position in the tooth trace direction being taken as a boundary.

A wave generator 5 is mounted inside the externally toothed gear 4. The externally toothed gear 4 is ellipsoidally flexed by the wave generator 5, and the two major-axis-direction end parts of the ellipsoidal shape of the externally toothed gear 4 mesh with the first internally toothed gear 2S and the second internally toothed gear 2D. The vertical cross-section in FIG. 2(a) is taken along a plane that includes the central axis 1a and the major axis of the ellipsoidally flexed externally toothed gear.

The wave generator 5 comprises a first wave generator portion 5S arranged on one side in the direction of the central axis 1a, and a second wave generator portion 5D arranged on the other side. The first wave generator portion 5S is mounted inside the first externally toothed gear portion 4S, and causes the first externally toothed gear portion 4S to flex ellipsoidally and partially mesh with the first internally toothed gear 2S. The second wave generator portion 5D is mounted inside the second externally toothed gear portion 4D, and causes the second externally toothed gear portion 4D to flex ellipsoidally and partially mesh with the second internally toothed gear 2D.

The first wave generator portion 5S comprises a rigid wave generator plug 6 shared with the second wave generator portion 5D, and a first wave generator bearing 7S mounted to an ellipsoidal outer-peripheral surface of the wave generator plug 6. Similarly, the second wave generator portion 5D comprises the wave generator plug 6 and a second wave generator bearing 7D mounted to an ellipsoidal outer-peripheral surface of the wave generator plug 6. One side of the ellipsoidal outer-peripheral surface of the wave generator plug 6 is a first ellipsoidal outer-peripheral surface 6S defined by a first ellipsoidal curve C1 (see FIG. 3(a)), and the other side of the ellipsoidal outer-peripheral surface of the wave generator plug 6 is a second ellipsoidal outer-peripheral surface 6D defined by a second ellipsoidal curve C2 (see FIG. 3(a)), a central position in the direction of the central axis 1a being taken as a boundary.

The first wave generator bearing 7S comprises an inner race 8a and an outer race 8b capable of flexing in the radial direction, and a plurality of balls 8c mounted so as to be able to roll in an annular path formed between the inner and outer races 8a, 8b. The first wave generator bearing 7S is mounted to the first ellipsoidal outer-peripheral surface 6S of the wave generator plug 6 and is ellipsoidally flexed. The first externally toothed gear portion 4S is ellipsoidally flexed substantially along the first ellipsoidal curve C1 by the ellipsoidally flexed outer race 8b.

Similarly, the second wave generator bearing 7D comprises an inner race 9a and an outer race 9b capable of flexing in the radial direction, and a plurality of balls 9c mounted so as to be able to roll in an annular path formed between the inner and outer races 9a, 9b. The second wave generator bearing 7D is mounted to the second ellipsoidal outer-peripheral surface 6D of the wave generator plug 6 and is ellipsoidally flexed. The second externally toothed gear portion 4D is ellipsoidally flexed substantially along the second ellipsoidal curve C2 by the ellipsoidally flexed outer race 9b.

Figure 3:
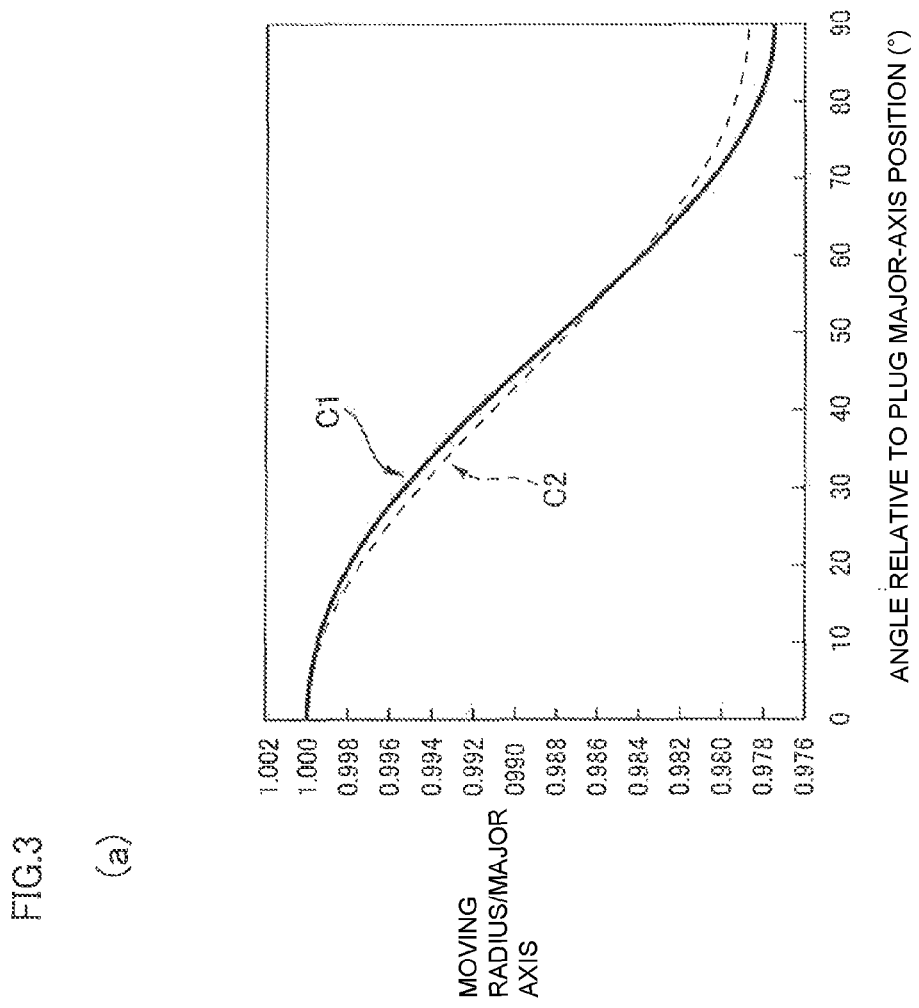

The first ellipsoidal curve C1 and the second ellipsoidal curve C2 will be described below with reference to FIG. 3. FIG. 3(a) is a graph showing the first and second ellipsoidal curves C1, C2 of the wave generator. In the graph, the horizontal axis shows the angle of the wave generator plug 6 relative to a plug major-axis position, and the vertical axis shows the ratio of the moving radius R of the wave generator plug 6 to the plug major axis RL. FIG. 3(*b*) is a diagram schematically showing the first and second ellipsoidal outer-peripheral surfaces 6S, 6D of the wave generator plug 6 defined by these curves C1, C2.

As shown in these drawings, in the present example, the major-axis positions of the first and second ellipsoidal outer-peripheral surfaces 6S, 6D of the wave generator plug 6 are set so as to occupy the same position. The major-axis positions can also be set so as to occupy different positions. For example, as disclosed in Patent Document 3, the major-axis position of the first ellipsoidal outer-peripheral surface 6S can be set so as to occupy the minor-axis position of the second ellipsoidal outer-peripheral surface 6D.

The first ellipsoidal curve C1 defining the first ellipsoidal outer-peripheral surface 6S and the second curve C2 defining the second ellipsoidal outer-peripheral surface 6D are set so as to satisfy the following three conditions:

(Condition 1) the first and second ellipsoidal curves C1, C2 are of equal circumference;

(Condition 2) the major axes RL1, RL2 of the first and second ellipsoidal curves C1, C2 are identical; and (Condition 3) the minor-axis dimension RS1 of the first ellipsoidal curve C1 is shorter than the minor-axis dimension RS2 of the second ellipsoidal curve C2.

For example, by setting the coefficients that define the shaping curve of the wave generator plug disclosed in Patent Document 4 so that these conditions are satisfied, it is possible to define first and second ellipsoidal curves C1, C2. Specific first and second ellipsoidal curves C1, C2 can be individually established in accordance with the model number, reduction ratio, acting load, and other attributes of the strain wave gearing 1 so that variation in the ball load distribution and equivalent ball load can be minimized.

When the flat-type strain wave gearing 1 configured as described above is used as reducer, typically, the wave generator 5 is a rotation-inputting component, and is secured to a motor shaft or the like (not shown). The second internally toothed gear 2D is a reduced-rotation-outputting component secured to a driven member (not shown). When the wave generator 5 rotates, the position at which the first internally toothed gear 2S meshes with the first externally toothed gear portion 4S and the position at which the second internally toothed gear 2D meshes with the second externally toothed gear portion 4D move in a circumferential direction. In a single, full rotation made by the wave generator 5, the externally toothed gear 4 rotates at an angle corresponding to the difference in the number of teeth with respect to the stationary-side internally toothed gear. Because the second internally toothed gear 2D has the same number of teeth as the externally toothed gear 4, the second internally toothed gear 2D rotates integrally with the externally toothed gear 4. Therefore, the rotation of the wave generator 5 is reduced in accordance with the difference in the number of teeth, and the reduced rotation is outputted from the second internally toothed gear 2D. It is also possible for the first internally toothed gear to be a driving-side internally toothed gear, and for the second internally toothed gear to be a stationary-side internally toothed gear.

In the strain wave gearing 1 of the present example, the shapes of the ellipsoidal outer-peripheral surfaces of the first wave generator portion 5S and second wave generator portion 5D of the wave generator 5 are defined. It is possible to maintain excellent meshing between the first internally toothed gear 2S and the first externally toothed gear portion 4S and excellent meshing between the second internally toothed gear 2D and the second externally toothed gear portion 4D to a greater extent than when a conventional wave generator comprising an outer peripheral surface defined by a single ellipsoidal curve is used.

Additionally, the ball distributed loads of the wave generator bearings 7S, 7D of the first and second wave generator portions can be made uniform, and equivalent ball load can be reduced. This makes it possible to extend the service life of the wave generator bearings 7S, 7D, making it possible for the service life of the wave generator 5, and consequently also for the strain wave gearing 1, to be extended.

Ball bearings are used as the wave generator bearings in the example described above; however, the present invention can similarly be applied in cases when needle bearings, roller bearings, or the like are used.

The invention claimed is:

1. A wave generator for a strain wave gearing in which a cylindrical externally toothed gear capable of flexing in a radial direction is caused to flex ellipsoidally and partially mesh with both a rigid first internally toothed gear and a rigid second internally toothed gear coaxially arranged adjacent to the first internally toothed gear, the wave generator comprising:

a first wave generator portion for causing a first externally toothed gear portion on one side of the externally toothed gear in a tooth trace direction thereof to flex ellipsoidally and partially mesh with the first internally toothed gear, and a second wave generator portion for causing a second externally toothed gear portion on the other side of the externally toothed gear in the tooth trace direction to flex ellipsoidally and mesh with the second internally toothed gear;

the number of teeth on the first internally toothed gear being 2n more than the number of teeth on the externally toothed gear, assuming n to be a positive integer, and the number of teeth on the second internally toothed gear being equal to the number of teeth on the externally toothed gear;

the first wave generator portion having an ellipsoidal contour defined by a first ellipsoidal curve, and the second wave generator portion having an ellipsoidal contour defined by a second ellipsoidal curve;

a circumference of the first ellipsoidal curve being equal to a circumference of the second ellipsoidal curve;

a major axis of the first ellipsoidal curve being identical to a major axis of the second ellipsoidal curve; and a minor axis of the first ellipsoidal curve being shorter than a minor axis of the second ellipsoidal curve.

2. The wave generator for a strain wave gearing according to claim 1, wherein the first wave generator portion comprises a first wave generator plug having a first ellipsoidal outer-peripheral surface defined by the first ellipsoidal curve, and an ellipsoidally flexed first wave generator bearing mounted to the first ellipsoidal outer-peripheral surface of the first wave generator plug, and the second wave generator portion comprises a second wave generator plug having a second ellipsoidal outer-peripheral surface defined by the second ellipsoidal curve, and an ellipsoidally flexed second wave generator bearing mounted to the second ellipsoidal outer-peripheral surface of the second wave generator plug.

3. A strain wave gearing comprising:

a rigid internally toothed gear; an externally toothed gear capable of flexing in a radial direction thereof, the externally toothed gear being arranged inside the internally toothed gear; and a wave generator for causing the externally toothed gear to flex ellipsoidally and partially mesh with the internally toothed gear;

the internally toothed gear having a first internally toothed gear and a second internally toothed gear coaxially arranged adjacent to the first internally toothed gear;

the externally toothed gear having, on one side thereof in a tooth trace direction thereof, a first externally toothed gear portion capable of meshing with the first internally toothed gear, and, on the other side thereof in the tooth trace direction, a second externally toothed gear portion, the second externally toothed gear portion being capable of meshing with the second internally toothed gear;

the number of teeth on the first internally toothed gear being 2n more than the number of teeth on the externally toothed gear, assuming n to be a positive integer, and the number of teeth on the second internally toothed gear being equal to the number of teeth on the externally toothed gear; and the wave generator being the wave generator as set forth in claim 1.

4. The strain wave gearing according to claim 3, wherein the first internally toothed gear is a stationary-side internally toothed gear secured so as to not rotate, and the second internally toothed gear is a driving-side internally toothed gear capable of rotating.

5. A strain wave gearing comprising:

a rigid internally toothed gear; an externally toothed gear capable of flexing in a radial direction thereof, the externally toothed gear being arranged inside the internally toothed gear;

and a wave generator for causing the externally toothed gear to flex ellipsoidally and partially mesh with the internally toothed gear;

the internally toothed gear having a first internally toothed gear and a second internally toothed gear coaxially arranged adjacent to the first internally toothed gear;

the externally toothed gear having, on one side thereof in a tooth trace direction thereof, a first externally toothed gear portion capable of meshing with the first internally toothed gear, and, on the other side thereof in the tooth trace direction, a second externally toothed gear portion, the second externally toothed gear portion being capable of meshing with the second internally toothed gear;

the number of teeth on the first internally toothed gear being 2n more than the number of teeth on the externally toothed gear, assuming n to be a positive integer, and the number of teeth on the second internally toothed gear being equal to the number of teeth on the externally toothed gear; and the wave generator being the wave generator as set forth in claim 2.

* * * * *